United States Patent
Huang et al.

(10) Patent No.: US 11,387,694 B2
(45) Date of Patent: Jul. 12, 2022

(54) ASYNCHRONOUS STARTING AND SYNCHRONOUS RELUCTANCE ELECTRIC MOTOR ROTOR, ELECTRIC MOTOR AND COMPRESSOR

(71) Applicant: GREEN REFRIGERATION EQUIPMENT ENGINEERING RESEARCH CENTER OF ZHUHAI GREE CO., LTD., Zhuhai (CN)

(72) Inventors: Hui Huang, Zhuhai (CN); Yusheng Hu, Zhuhai (CN); Jinfei Shi, Zhuhai (CN); Man Wu, Zhuhai (CN); Bin Chen, Zhuhai (CN); Yong Xiao, Zhuhai (CN)

(73) Assignee: GREEN REFRIGERATION EQUIPMENT ENGINEERING RESEARCH CENTER OF ZHUHAI GREE CO., LTD., Zhuhai (CN)

( * ) Notice: Subject to any disclaimer, the term of this patent is extended or adjusted under 35 U.S.C. 154(b) by 262 days.

(21) Appl. No.: 16/650,523

(22) PCT Filed: Dec. 13, 2018

(86) PCT No.: PCT/CN2018/120929
§ 371 (c)(1),
(2) Date: Mar. 25, 2020

(87) PCT Pub. No.: WO2019/114795
PCT Pub. Date: Jun. 20, 2019

(65) Prior Publication Data
US 2020/0280224 A1    Sep. 3, 2020

(30) Foreign Application Priority Data
Dec. 14, 2017  (CN) .......................... 201711372168.5

(51) Int. Cl.
    *H02K 17/16*    (2006.01)
    *H02K 1/24*     (2006.01)

(52) U.S. Cl.
    CPC ........... *H02K 1/246* (2013.01); *H02K 17/165* (2013.01); *H02K 2213/03* (2013.01)

(58) Field of Classification Search
    CPC .. H02K 1/246; H02K 17/165; H02K 2213/03; H02K 19/14; H02K 1/22
    See application file for complete search history.

(56) References Cited

U.S. PATENT DOCUMENTS

| 5,831,367 A | 11/1998 | Fei et al. |
| 2011/0012464 A1* | 1/2011 | Lee .................. H02K 1/276 |
| | | 310/216.106 |

(Continued)

FOREIGN PATENT DOCUMENTS

| CN | 2086947 U | 10/1991 |
| CN | 1419331 A | 5/2003 |

(Continued)

OTHER PUBLICATIONS

International Search Report dated Mar. 7, 2019 in corresponding International application No. PCT/CN2018/120929; 4 pages.

*Primary Examiner* — Thomas Truong
(74) *Attorney, Agent, or Firm* — Maier & Maier, PLLC (57) ABSTRACT

An asynchronous starting and synchronous reluctance electric motor rotor, an electric motor and a compressor. The asynchronous starting and synchronous reluctance electric motor rotor includes a rotor core. The rotor core includes: a first magnetic barrier structure, with multiple groups of first magnetic barrier portions arranged at interval along a d-axis of the rotor core; and a second magnetic barrier structure, including two communicating magnetic barrier slots arranged at interval along the d-axis, the two communicating magnetic barrier slots being respectively located on two (Continued)

sides of the first magnetic barrier structure, the communicating magnetic barrier slots being arc-shaped slots extending circumferentially along the rotor core, and slot walls of two ends of the arc-shaped slots being arranged parallel to a q-axis.

20 Claims, 9 Drawing Sheets

(56) References Cited

U.S. PATENT DOCUMENTS

| | | | |
|---|---|---|---|
| 2016/0190879 | A1 | 6/2016 | Zheng et al. |
| 2018/0198356 | A1 | 7/2018 | Gieras |
| 2021/0218298 | A1* | 7/2021 | Hu .................. H02K 1/246 |

FOREIGN PATENT DOCUMENTS

| | | |
|---|---|---|
| CN | 1726629 A | 1/2006 |
| CN | 1255925 C | 5/2006 |
| CN | 1889326 A | 1/2007 |
| CN | 1950992 A | 4/2007 |
| CN | 102047531 A | 5/2011 |
| CN | 202384968 U | 8/2012 |
| CN | 103081299 A | 5/2013 |
| CN | 103151887 A | 6/2013 |
| CN | 103166395 A | 6/2013 |
| CN | 103208894 A | 7/2013 |
| CN | 104901452 A | 9/2015 |
| CN | 105103420 A | 11/2015 |
| CN | 105122613 A | 12/2015 |
| CN | 105144555 A | 12/2015 |
| CN | 102545422 B | 1/2016 |
| CN | 105553139 A | 5/2016 |
| CN | 105871160 A | 8/2016 |
| CN | 106100500 A | 11/2016 |
| CN | 106208450 A | 12/2016 |
| CN | 106537728 A | 3/2017 |
| CN | 107994698 A | 5/2018 |
| CN | 108110920 A | 6/2018 |
| CN | 207573101 U | 7/2018 |
| CN | 109347223 A | 2/2019 |
| CN | 109347224 A | 2/2019 |
| CN | 109347225 A | 2/2019 |
| CN | 109494903 A | 3/2019 |
| CN | 109525049 A | 3/2019 |
| CN | 109586435 A | 4/2019 |
| CN | 209233584 U | 8/2019 |
| CN | 209709775 U | 11/2019 |
| JP | 2001258220 A | 9/2001 |
| JP | 2003259615 A | 9/2003 |
| JP | 200456936 A | 2/2004 |
| JP | 20056416 A | 1/2005 |
| JP | 2005245052 A | 9/2005 |
| JP | 2006121765 A | 5/2006 |
| JP | 5685952 B2 | 3/2015 |
| KR | 1020080061037 A | 7/2008 |

* cited by examiner

Fig. 1

PRIOR ART

ASYNCHRONOUS STARTING AND SYNCHRONOUS RELUCTANCE ELECTRIC MOTOR ROTOR, ELECTRIC MOTOR AND COMPRESSOR

TECHNICAL FIELD

The present invention relates to the technical field of electric motors and in particular to an asynchronous starting and synchronous reluctance electric motor rotor, an electric motor and a compressor.

BACKGROUND OF THE INVENTION

An asynchronous starting and synchronous reluctance electric motor integrates structural characteristics of an induction electric motor and a reluctance electric motor. Starting is realized by generation of a torque by squirrel cage induction, and the constant-speed operation of the electric motor is realized by generation of a reluctance torque by the difference in inductance of the rotor, so that the electric motor can be started immediately when it is directly connected to the power supply. Compared with asynchronous starting permanent magnet electric motors, asynchronous starting and synchronous reluctance electric motors do not use rare earth permanent magnet materials, and there is no demagnetization problem. The electric motor has low cost and high reliability.

Figure 1:
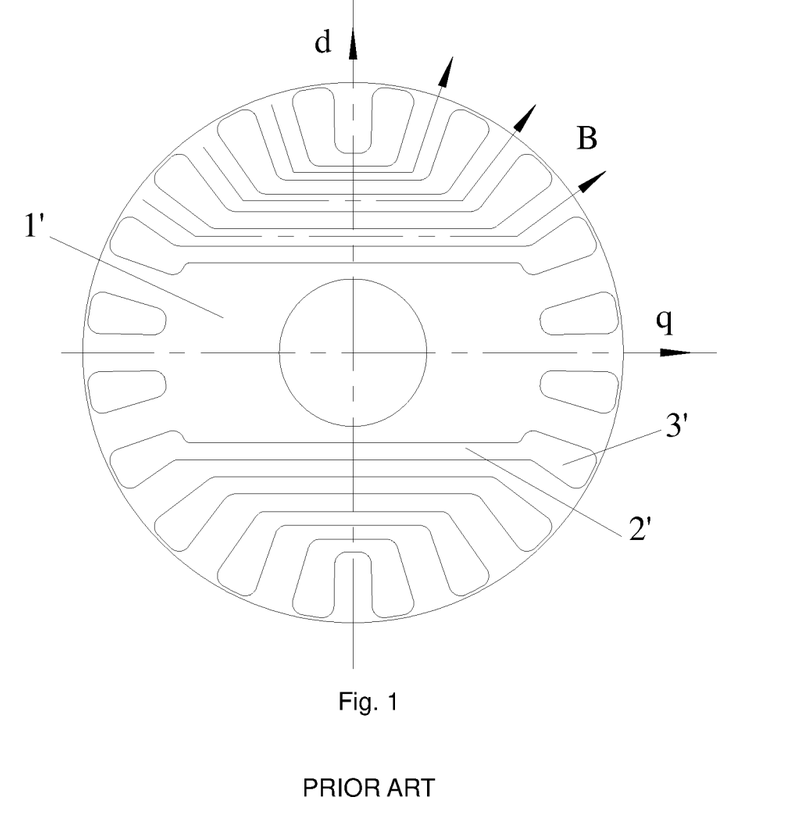
FIG. 1 is a top view of a rotor of an electric motor in the prior art.

In the prior art, as shown in FIG. 1, Patent CN 1255925C provided a cheap and easy-to-start synchronous induction motor and a manufacturing apparatus and method for the synchronous induction motor, that is, first slit portions 2' and second slit portions 3' communicated with the first slit portions 2' are arranged in the q-axis and d-axis directions of the rotor core 1', wherein the second slit portions 3' and the first slit portions 2' are filled with an electrically conductive material. The first slit portions 2' are linear, and the second slit portions 3' are radially arranged at regular intervals on the circumference of the rotor core 1'.

However, due to the above-mentioned structural arrangement of the second slit portion 3', the magnetic flux between the second slit portions 3' flows toward a surface perpendicular to the rotor core 1'. The second slit portions 3' obstruct the magnetic flux in the q-axis direction. In particular, the closer the second slit portions 1' is to the d-axis, the more obvious the magnetic flux along the q-axis is obstructed and the smoother the magnetic flux along the d-axis flows. Therefore, the difference in magnetic flux between the d-axis and the q-axis is not obvious, resulting in low saliency ratio and insufficient output and efficiency of the motor.

SUMMARY OF THE INVENTION

The main purpose of the present invention is to provide an asynchronous starting and synchronous reluctance electric motor rotor, an electric motor and a compressor, to solve the problem in the prior art of low operating efficiency of an asynchronous starting and synchronous reluctance electric motor rotor of an electric motor.

For this purpose, in one aspect of the present invention, an asynchronous starting and synchronous reluctance electric motor rotor is provided, comprising a rotor core. The rotor core comprises: a first magnetic barrier structure, comprising multiple groups of first magnetic barrier portions arranged at interval along a d-axis of the rotor core; and a second magnetic barrier structure, comprising two communicating magnetic barrier slots arranged at interval along the d-axis, the two communicating magnetic barrier slots being respectively located on two sides of the first magnetic barrier structure, the communicating magnetic barrier slots being arc-shaped slots extending circumferentially along the rotor core, and slot walls of two ends of the arc-shaped slots being arranged parallel to a q-axis.

Further, two ends of some or all of the first magnetic barrier portions are parallel to the q-axis of the rotor core.

Further, as the multiple groups of first magnetic barrier portions, one or more of linear slots, second arc-shaped slots and specially-shaped slots are used.

Further, the first magnetic barrier structure further comprises: multiple supplementary slots, respectively located between an end of the first magnetic barrier portion and an outer edge of the rotor core.

Further, the supplementary slot extends in a direction parallel to the q-axis.

Further, the rotor core has a central through hole, through which a rotating shaft runs; some of the first magnetic barrier portions are specially-shaped slots, and each of the specially-shaped slots comprises a first linear slot section, an arc-shaped slot section and a second linear slot section, which are successively connected to each other; and, both the first linear slot section and the second linear slot section are parallel to the q-axis, and the arc-shaped slot section protrudes toward a side away from the central through hole.

Further, some of the first magnetic barrier portions are linear slots, the linear slots are parallel to the q-axis, and the linear slots are located between the communicating magnetic barrier slots and the specially-shaped slots.

Further, the second magnetic barrier structure further comprises: four independent magnetic barrier slots, respectively located on two sides of the q-axis pairwise, the independent magnetic barrier slots extending in a direction parallel to the q-axis.

Further, the two independent magnetic barrier slots in a group are symmetrically arranged along the d-axis; and/or the independent magnetic barrier slots in different groups are symmetrically arranged along the q-axis.

Further, there is a distance D1 between adjacent two of the supplementary slots and there is a distance D2 between adjacent two of the arc-shaped slot sections, where D1≥D2.

Further, there are distance D3 and distance D4 between the independent magnetic barrier slot and the two supplementary slots adjacent thereto, and in the d-axis direction, there is a distance D5 between the linear slot and the arc-shaped slot section adjacent thereto, where D3+D4≥D5.

Further, there is a distance D6 between the two supplementary slots near the q-axis and there is a distance D7 between the two first linear slot sections near the q-axis, where D6≥D7.

Further, the distance D6, the distance D1, the distance D3 and the distance D4 have the following relationship: D6>D1, and/or D6>D3, and/or D6>D4.

Further, in the d-axis direction, there are distance D8 and distance D9 between the wall of the central through hole and the two arc-shaped slot sections adjacent thereto, where D8+D9≥D6.

Further, the sum of widths of all of the communicating magnetic barrier slots and all of the first magnetic barrier portions is denoted by M, and there is a distance m7 between the wall of the central through hole and the outer edge of the rotor core, where $$0.3 \leq \frac{M}{m7} \leq 0.5.$$

Further, the rotor core has a central through hole, through which a rotating shaft runs; when some or all of the first magnetic barrier portions are second arc-shaped slots, the second arc-shaped slots are arranged to evade the central through hole; and the second arc-shaped slots protrude toward a side away from the central through hole.

Further, the two communicating magnetic barrier slots are symmetrically arranged along the q-axis; and/or the communicating magnetic barrier slot is symmetrically arranged along the d-axis.

Further, the multiple groups of first magnetic barrier portions are symmetrically arranged along the q-axis; and/or each first magnetic barrier portion is symmetrically arranged along the d-axis.

Further, the first magnetic barrier structure and/or the second magnetic barrier structure are/is filled with a material that is electrically conductive but not magnetically conductive.

Further, there are cast-aluminum end rings at two ends of the rotor core, and by the cast-aluminum end rings, all of the communicating magnetic barrier slots, the supplementary slots and the independent magnetic barrier slots are communicated to each other to form a squirrel cage.

Further, the communicating magnetic barrier slots have a radian $\alpha$ of $20° \leq \alpha \leq 60°$.

In another aspect of the present invention, an electric motor is provided, comprising the asynchronous starting and synchronous reluctance electric motor rotor described above.

Further, the electric motor further comprises a stator arranged outside the asynchronous starting and synchronous reluctance electric motor rotor, there is an air gap $\delta$ between the stator core of the stator and the rotor core of the asynchronous starting and synchronous reluctance electric motor rotor, and there is a distance L1 between the independent magnetic barrier slot for the asynchronous starting and synchronous reluctance electric motor rotor and the outer edge of the rotor core as well as between the supplementary slot for the asynchronous starting and synchronous reluctance electric motor rotor and the outer edge of the rotor core, where $0.5\delta \leq L1 < \delta$.

Further, the electric motor further comprises a stator arranged outside the asynchronous starting and synchronous reluctance electric motor rotor, there is an air gap $\delta$ between the stator core of the stator and the rotor core of the asynchronous starting and synchronous reluctance electric motor rotor, and there is a distance L2 between the supplementary slot for the asynchronous starting and synchronous reluctance electric motor rotor and the first magnetic barrier portion for the asynchronous starting and synchronous reluctance electric motor rotor, where $0.5\delta \leq L2 \leq \delta$.

Further, the electric motor further comprises a stator arranged outside the asynchronous starting and synchronous reluctance electric motor rotor, there is an air gap $\delta$ between the stator core of the stator and the rotor core of the asynchronous starting and synchronous reluctance electric motor rotor, and there is a distance L3 between the communicating magnetic barrier slot and the outer edge of the rotor core, where $\delta \leq L3 \leq 2\delta$.

Further, the electric motor further comprises a stator arranged outside the asynchronous starting and synchronous reluctance electric motor rotor, there is a distance D6 between two supplementary slots, near the q-axis, for the asynchronous starting and synchronous reluctance electric motor rotor, and the tooth width K of the stator core of the stator and the distance D6 have the following relationship: $D6 > K$.

In still another aspect of the present invention, a compressor is provided, comprising the electric motor described above.

With the technical solutions of the present invention, the asynchronous starting and synchronous reluctance electric motor rotor comprises a rotor core. The rotor core comprises a first magnetic barrier structure and a second magnetic barrier structure. The first magnetic barrier structure comprises multiple groups of first magnetic barrier portions arranged at interval along a d-axis of the rotor core. The second magnetic barrier structure comprises two communicating magnetic barrier slots arranged at interval along the d-axis, the two communicating magnetic barrier slots being respectively located on two sides of the first magnetic barrier structure, the communicating magnetic barrier slots being arc-shaped slots extending circumferentially along the rotor core, and slot walls of two ends of the arc-shaped slots being arranged parallel to a q-axis. In this way, the first magnetic barrier portions are arranged at interval along the d-axis of the rotor core 10 and extended toward the q-axis, and the slot walls of two ends of the communicating magnetic barrier slots 31 are arranged parallel to the q-axis, so that the magnetic flux of the asynchronous starting and synchronous reluctance electric motor rotor in the q-axis direction is increased. Thus, the magnetic flux flows smoothly in the q-axis direction, and the magnetic flux in the d-axis direction is obstructed, so that the difference in magnetic flux of the asynchronous starting and synchronous reluctance electric motor rotor between the d-axis direction and the q-axis direction is increased. In this way, the output power and the operating efficiency of the asynchronous starting and synchronous reluctance electric motor rotor are improved.

During the operation of the asynchronous starting and synchronous reluctance electric motor rotor in the present application, the magnetic flux can flow between the first magnetic barrier portions 21 and between the first magnetic barrier portions 21 and the communicating magnetic barrier slots 31 in the q-axis direction. It is ensured that the magnetic flux in the q-axis direction flows smoothly and the magnetic flux in the d-axis direction is obstructed. Thus, the difference in magnetic flux between the d-axis direction and the q-axis direction is increased. Accordingly, a greater reluctance torque is generated by the asynchronous starting and synchronous reluctance electric motor rotor. Thus, the output of the electric motor is increased, and the operating efficiency of the electric motor is improved. Additionally, the asynchronous starting and synchronous reluctance electric motor rotor in this embodiment does not use any magnet, and there is no demagnetization problem. The operating reliability of the asynchronous starting and synchronous reluctance electric motor rotor is improved, with low cost.

BRIEF DESCRIPTION OF THE DRAWINGS

The accompanying drawings illustrated herein, which constitute part of the present application, are used to provide further understanding of the present invention, and exemplary embodiments of the present invention and the description thereof are used to explain the present invention and not intended to inappropriately limit the present invention. In the drawings.

REFERENCE NUMERALS

1': rotor core; 2': first slit portion; 3': second slit portion; 10: rotor core; 11: central through hole; 21: first magnetic barrier portion; 211: first linear slot section; 212: arc-shaped slot section; 213: second linear slot section; 214: complementary slot; 31: communicating magnetic barrier slot; 32: independent magnetic barrier slot; 40: stator; and 50: cast-aluminum end ring.

DETAILED DESCRIPTION OF THE EMBODIMENTS

It is to be noted that the embodiments of the present application and features in the embodiments may be combined if not conflicted. The present invention will be described in detail below with reference to the accompanying drawings by embodiments.

It should be noted that, unless otherwise specified, all technical and scientific terms used in the present application have the same meaning as commonly understood by a person of ordinary skill in the art to which the present application belongs.

In the present invention, orientation terms such as "up" and "down" are usually used for directions shown in the drawings, or for vertical, perpendicular, or gravity directions, unless otherwise stated. Similarly, for ease of understanding and description, "left" and "right" usually refer to left and right shown in the drawings; and "inside" and "outside" refer to inside and outside relative to the outline of each component itself. Those orientation terms are not intended to limit the present invention.

To solve the problem in the prior art of low operating efficiency of an asynchronous starting and synchronous reluctance electric motor rotor of an electric motor, the present application provides an asynchronous starting and synchronous reluctance electric motor rotor, an electric motor and a compressor.

Embodiment 1

As shown in FIGS. 2-5, the asynchronous starting and synchronous reluctance electric motor rotor comprises a rotor core 10. The rotor core 10 comprises a first magnetic barrier structure and a second magnetic barrier structure. The first magnetic barrier structure comprises multiple groups of first magnetic barrier portions 21 arranged at interval along a d-axis of the rotor core 10. The second magnetic barrier structure comprises two communicating magnetic barrier slots 31 arranged at interval along the d-axis, the two communicating magnetic barrier slots 31 being respectively located on two sides of the first magnetic barrier structure, the communicating magnetic barrier slots 31 being arc-shaped slots extending circumferentially along the rotor core 10, and slot walls of two ends of the arc-shaped slots being arranged parallel to a q-axis.

With the technical solution of this embodiment, the first magnetic barrier portions 21 are arranged at interval along the d-axis of the rotor core 10 and extended toward the q-axis, and the slot walls of two ends of the communicating magnetic barrier slots 31 are arranged parallel to the q-axis, so that the magnetic flux of the rotor in the q-axis direction is increased. Thus, the magnetic flux flows smoothly in the q-axis direction, and the magnetic flux in the d-axis direction is obstructed, so that the difference in magnetic flux of the rotor between the d-axis direction and the q-axis direction is increased. In this way, the output power and the operating efficiency of the asynchronous starting and synchronous reluctance electric motor rotor are improved.

During the operation of the asynchronous starting and synchronous reluctance electric motor rotor in this embodiment, the magnetic flux can flow between the first magnetic barrier portions 21 and between the first magnetic barrier portions 21 and the communicating magnetic barrier slots 31 in the q-axis direction. It is ensured that the magnetic flux in the q-axis direction flows smoothly and the magnetic flux in the d-axis direction is obstructed. Thus, the difference in magnetic flux between the d-axis direction and the q-axis direction is increased. Accordingly, a greater reluctance torque is generated by the asynchronous starting and synchronous reluctance electric motor rotor. Thus, the output of the electric motor is increased, and the operating efficiency of the electric motor is improved. Additionally, the asynchronous starting and synchronous reluctance electric motor rotor in this embodiment does not use any magnet, and there is no demagnetization problem. The operating reliability of the asynchronous starting and synchronous reluctance electric motor rotor is improved, with low cost.

In this embodiment, the obstruction to the magnetic flux of the asynchronous starting and synchronous reluctance electric motor rotor in the q-axis direction in the prior art is alleviated, the difference in magnetic flux between the d-axis direction and the q-axis direction is increased, and the output power and the efficiency of the electric motor are improved.

In this embodiment, the communicating magnetic barrier slots 31 on the outermost layer of the rotor core 10 further increase the reluctance in the d-axis direction and decrease the magnetic flux in the d-axis direction, and also serve as a starting squirrel cage which improves the starting performance of the electric motor.

Figure 3:
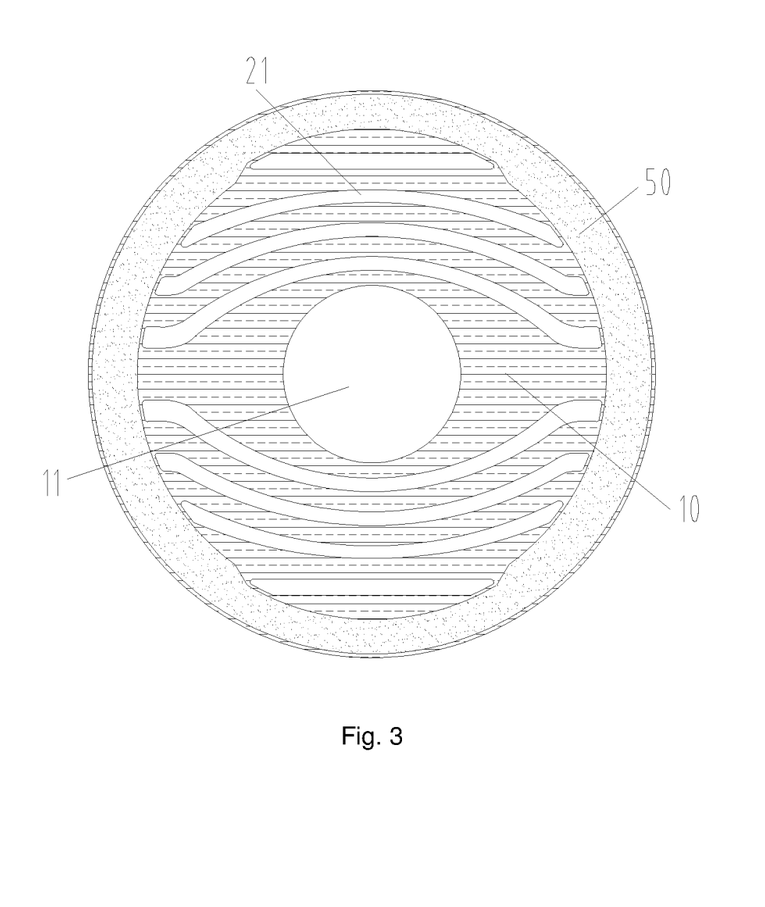
FIG. 3 is a top view of the asynchronous starting and synchronous reluctance electric motor rotor of FIG. 2.
Figure 4:
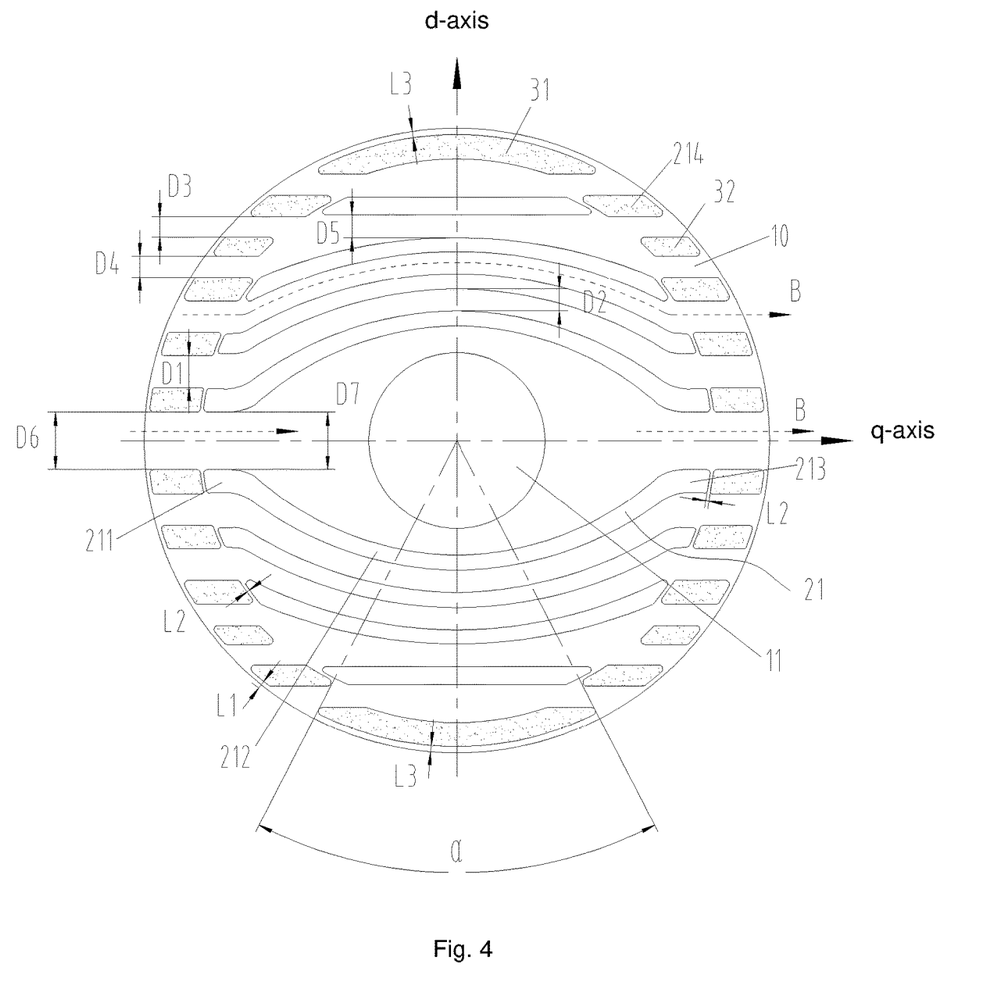
FIG. 4 is a top view of the asynchronous starting and synchronous reluctance electric motor rotor of FIG. 3, with cast-aluminum end rings already removed.
Figure 5:
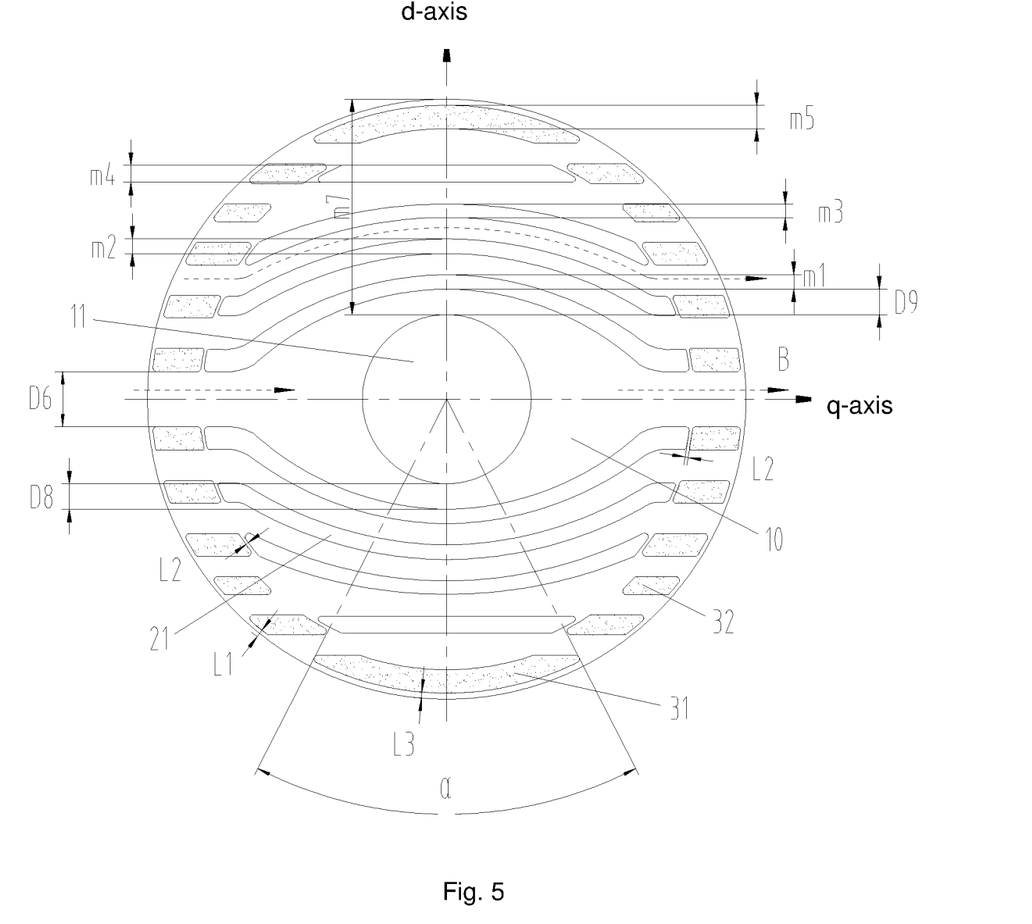
FIG. 5 is a top view of the asynchronous starting and synchronous reluctance electric motor rotor of FIG. 3, with cast-aluminum end rings already removed.

As shown in FIGS. 3-5, two ends of some or all of the first magnetic barrier portions 21 are parallel to the q-axis of the rotor core 10. In this way, at two ends of the first magnetic barrier portions 21, the above arrangement obstructs the magnetic flux in the d-axis direction and further increases the difference in magnetic flux between the d-axis direction and the q-axis direction. Accordingly, a greater reluctance torque is generated. Thus, the output of the electric motor is increased, and the operating efficiency of the electric motor is improved.

As shown in FIGS. 3-5, some of the first magnetic barrier portions 21 are linear slots and some of the first magnetic barrier portions 21 are specially-shaped slots. In this way, for asynchronous starting and synchronous reluctance electric motor rotors of different specifications, different first magnetic barrier portions 21 are designed, so that the utilization of the rotor core 10 is increased. The magnetic flux of the asynchronous starting and synchronous reluctance electric motor rotor in the q-axis direction is increased while the magnetic flux of the asynchronous starting and synchronous reluctance electric motor rotor in the d-axis direction is obstructed, so that the difference in magnetic flux between the d-axis direction and the q-axis direction is increased. Thus, the operating performance of the asynchronous starting and synchronous reluctance electric motor rotor is improved.

As shown in FIG. 4, the first magnetic barrier structure further comprises multiple supplementary slots 214. Each of the multiple supplementary slots 214 is located between an end of a first magnetic barrier portion 21 and an outer edge of the rotor core 10. In this way, during the operation of the asynchronous starting and synchronous reluctance electric motor rotor, the supplementary slots 214 work together with the first magnetic barrier portions 21 and multiple magnetic flux flow channels are formed therebetween. The magnetic flux of the asynchronous starting and synchronous reluctance electric motor rotor in the q-axis direction is increased. Meanwhile, the supplementary slots 214, filled with an electrically conductive material, can generate an induced torque to realize the starting of the asynchronous starting and synchronous reluctance electric motor rotor and achieve the synchronization; and, the appropriate distribution of the supplementary slots 214 and the first magnetic barrier portions 21 enables the asynchronous starting and synchronous reluctance electric motor rotor to have great starting and operating performance.

Specifically, the supplementary slots 214 are arranged on the periphery of the rotor core 10 to realize asynchronous starting. Further, the supplementary slot 214 extends in a direction parallel to the q-axis. That is, the upper wall and the lower wall of the supplementary slot 214 are parallel to the q-axis. By the supplementary slots 214, the magnetic flux on the d-axis is decreased and the magnetic flux on the q-axis is increased. In this way, the first magnetic barrier portions 21 are located inside the rotor core 10; and the first magnetic barrier portion 21 and the two supplementary slots 214 adjacent thereto form a magnetic barrier in the d-axis direction and a magnetic flux flow channel in the q-axis direction. Thus, most of the magnetic flux flows in the q-axis direction and the flowing of the magnetic flux in the d-axis direction is obstructed. The difference in magnetic flux between the two directions is increased, and the operating efficiency and the output of the asynchronous starting and synchronous reluctance electric motor rotor are improved.

As shown in FIG. 4, with such an arrangement, the magnetic flux flowing through the supplementary slots 214 flows in a direction parallel to the q-axis, and the magnetic flux of the asynchronous starting and synchronous reluctance electric motor rotor in the d-axis direction is obstructed. Thus, the magnetic flux of the asynchronous starting and synchronous reluctance electric motor rotor in the q-axis direction is increased, and the difference in magnetic flux between the d-axis direction and the q-axis direction is further increased. Accordingly, a greater reluctance torque is generated by the asynchronous starting and synchronous reluctance electric motor rotor, and the operating efficiency of the asynchronous starting and synchronous reluctance electric motor rotor is improved.

As shown in FIG. 4, the rotor core 10 has a central through hole 11, through which a rotating shaft runs; some of the first magnetic barrier portions 21 are specially-shaped slots, and each of the specially-shaped slots comprises a first linear slot section 211, an arc-shaped slot section 212 and a second linear slot section 213, which are successively connected to each other; and, both the first linear slot section 211 and the second linear slot section 213 are parallel to the q-axis, and the arc-shaped slot section 212 protrudes toward a side away from the central through hole 11.

Specifically, during the operation of the asynchronous starting and synchronous reluctance electric motor rotor, the magnetic flux successively flows through one supplementary slot 214, the first linear slot section 211, the arc-shaped slot section 212 and the other supplementary slot 214. Thus, the magnetic flux flows smoothly in the q-axis direction, and the magnetic flux in the d-axis direction is obstructed, so that the difference in magnetic flux between the d-axis direction and the q-axis direction is increased. Accordingly, a greater reluctance torque is generated. Thus, the output of the electric motor is increased, and the operating efficiency of the electric motor is improved.

As shown in FIGS. 4 and 5, the linear slots are parallel to the q-axis, and the linear slots are located between the communicating magnetic barrier slots 31 and the specially-shaped slots. Specifically, there are two groups of linear slots, which are symmetrically arranged along the q-axis. At the linear slots, the magnetic flux flows in the q-axis direction and the magnetic flux in the d-axis direction is obstructed. It is ensured that the magnetic flux flowing through the linear slots flows in the q-axis direction, so that the difference in magnetic flux between the d-axis direction and the q-axis direction is increased. Thus, the output power of the electric motor is improved.

As shown in FIGS. 4 and 5, the second magnetic barrier structure further comprises four independent magnetic barrier slots 32. The four independent magnetic barrier slots 32 are respectively located on two sides of the q-axis pairwise. The two independent magnetic barrier slots 32 in a group are arranged at interval, and a connecting line between the two independent magnetic barrier slots 32 is parallel to the q-axis. The independent magnetic barrier slots 32 are located between the linear slots and the specially-shaped slots. Specifically, during the operation of the asynchronous starting and synchronous reluctance electric motor rotor, the independent magnetic barrier slots 32 do not work together with the first magnetic barrier portions 21. The magnetic flux lines enter the rotor core 10 from upper and lower sides of the independent magnetic barrier slots 32, and then flow in the channels between the linear slots and the specially-shaped slots. In this way, the flowing of the magnetic flux in the q-axis direction is ensured. Additionally, the four independent magnetic barrier slots are filled with a material that is electrically conductive but not magnetically conductive, and serve as a starting squirrel cage to improve the starting performance of the electric motor.

As shown in FIGS. 4 and 5, the two independent magnetic barrier slots 32 in a group are symmetrically arranged along the d-axis; and the independent magnetic barrier slots 32 in different groups are symmetrically arranged along the q-axis. With such an arrangement, the magnetic barriers on the rotor core 10 are symmetrically arranged, so that the magnetic flux is also symmetrical. Thus, the stress to the asynchronous starting and synchronous reluctance electric motor rotor is more uniform. This ensures that the asynchronous starting and synchronous reluctance electric motor rotor can operate stably, reduces the vibration and noise generated during the operation of the asynchronous starting and synchronous reluctance electric motor rotor, and improves the use experience.

As shown in FIG. 4, there is a distance D1 between adjacent two of the supplementary slots 214 and there is a distance D2 between adjacent two of the arc-shaped slot sections 212, where D1≥D2. The distance D2 is the shortest distance between adjacent two of the arc-shaped slot sections 212. In this way, with such an arrangement, it is ensured that there will be no oversaturated magnetic flux between adjacent two of the supplementary slots 214. Thus, the magnetic flux flows in the q-axis direction as much as possible. Accordingly, the magnetic flux in the q-axis direction is increased.

As shown in FIG. 4, there are distance D3 and distance D4 between the independent magnetic barrier slot 32 and the two supplementary slots 214 adjacent thereto, and along the d-axis, there is a distance D5 between the linear slot and the arc-shaped slot section 212 adjacent thereto, where D3+D4≥D5. The distance D5 is the shortest distance between the linear slot and the arc-shaped slot section 212 adjacent thereto. In this way, with such an arrangement, oversaturated magnetic flux between the independent magnetic barrier slot 32 and the two supplementary slots 214 adjacent thereto can be avoided. Thus, the magnetic flux flows in the q-axis direction as much as possible. Accordingly, the magnetic flux in the q-axis direction is increased.

As shown in FIG. 4, there is a distance D6 between the two supplementary slots 214 near the q-axis and there is a distance D7 between the two first linear slot sections 211 near the q-axis, where D6≥D7. In this way, with such an arrangement, oversaturated magnetic flux between the two supplementary slots 214 near the q-axis can be avoided. Thus, the magnetic flux flows in the q-axis direction as much as possible. Accordingly, the magnetic flux in the q-axis direction is increased.

As shown in FIG. 4, the distance D6, the distance D1, the distance D3 and the distance D4 have the following relationship: D6>D1, D6>D3, and D6>D4. In this way, with such an arrangement, the magnetic flux on the q-axis is more concentrated on the q-axis and works together with the stator to generate an effective torque to increase the output of the electric motor. Meanwhile, this avoids oversaturated magnetic flux on D6.

As shown in FIG. 5, along the d-axis, there are distance D8 and distance D9 between the wall of the central through hole 11 and the two arc-shaped slot sections 212 adjacent thereto, where D8+D9≥D6. The distance D8 and the distance D9 are the shortest distance between the wall of the central through hole 11 and the two arc-shaped slot sections 212 adjacent thereto. In this way, such an arrangement can avoid oversaturated magnetic flux between the wall of the central through hole 11 and the two arc-shaped slot sections 212 adjacent thereto. Such oversaturated event may obstruct the flowing of the magnetic flux on the q-axis.

As shown in FIG. 5, the sum of widths of all of the communicating magnetic barrier slots 31 and all of the first magnetic barrier portions 21 is denoted by M, and there is a distance m7 between the wall of the central through hole 11 and the outer edge of the rotor core 10, where $$0.3 \leq \frac{M}{m7} \leq 0.5.$$

M is the sum of m1, m2, m3, m4 and m5. In this way, with such an arrangement, the asynchronous starting and synchronous reluctance electric motor rotor has an appropriate ratio of magnetic barriers, thereby ensuring an enough magnetic barrier width to effectively obstruct the magnetic flux in the d-axis direction while ensuring an appropriate magnetic flux flow channel to avoid oversaturated magnetic flux. This increases the magnetic flux in the q-axis direction, thus increases the saliency ratio of the electric motor and the reluctance torque of the electric motor. Accordingly, the output of the electric motor is increased.

Figure 9:
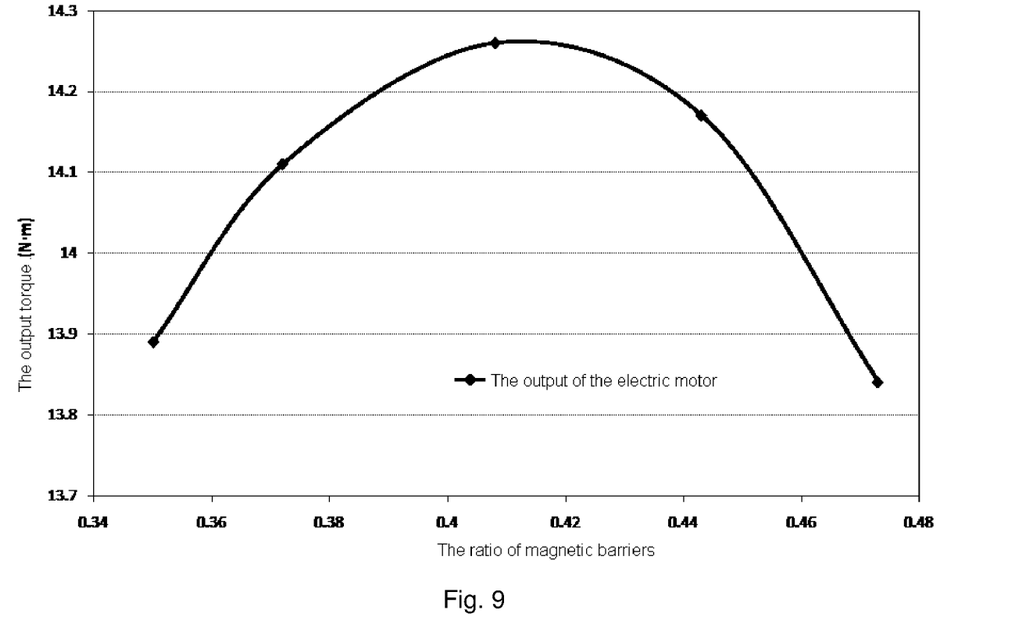
FIG. 9 is a graph showing the relationship between the ratio of magnetic barriers and the output of the electric motor in the synchronous reluctance electric motor in the present invention.

As shown in FIG. 9, when the ratio of magnetic barriers is 0.41, the output of the electric motor is highest. As shown, if the ratio of magnetic barriers is too high or too low, the output of the electric motor is decreased.

As shown in FIGS. 4 and 5, the two communicating magnetic barrier slots 31 are symmetrically arranged along the q-axis, and the communicating magnetic barrier slot 31 is symmetrically arranged along the d-axis.

As shown in FIGS. 3-5, the multiple groups of first magnetic barrier portions 21 are symmetrically arranged along the q-axis, and each first magnetic barrier portion 21 is symmetrically arranged along the d-axis. In this way, such an arrangement results in continuous and variously shaped magnetic barriers in the rotor core 10, so that the flowing of the magnetic flux is continuous and diverse. Thus, the stress to the asynchronous starting and synchronous reluctance electric motor rotor is more uniform. This improves the stability of the asynchronous starting and synchronous reluctance electric motor rotor during its operation.

In this embodiment, the supplementary slots 214 and the second magnetic barrier structure are filled with a material that is electrically conductive but not magnetically conductive. Optionally, the material that is electrically conductive but not magnetically conductive is aluminum material. In this way, such an arrangement can ensure the normal starting of the asynchronous starting and synchronous reluctance electric motor rotor.

Specifically, the aluminum material is filled in corresponding slots on the rotor core 10 to form, as cast-aluminum, the first magnetic barrier portions 21, the communicating magnetic barrier slots 31, the supplementary slots 214 and the independent magnetic barrier slots 32, with a purpose of generating, when the electric motor is started, an induced current which works together with the current for the stator to generate an induced torque to start the electric motor.

It is to be noted that the material that is electrically conductive but not magnetically conductive is not limited thereto, and other materials may be possible.

As shown in FIGS. 4 and 5, the communicating magnetic barrier slots 31 have a radian α of 20°≤α≤60°. In this way, the reluctance of the asynchronous starting and synchronous reluctance electric motor rotor in the d-axis direction can be further increased and the magnetic flux in the d-axis direction can be decreased. Meanwhile, the communicating magnetic barrier slots 31, filled with the electrically conductive material, serve as the squirrel cage to improve the starting performance of the asynchronous starting and synchronous reluctance electric motor rotor.

In this embodiment, by the appropriate design of magnetic barriers and cast-aluminum slots, the appropriate ratio of magnetic barriers is ensured, and no oversaturated magnetic flux occurs in the magnetic flux flow channels between the magnetic barriers to obstruct the flowing of the magnetic flux. The space of the asynchronous starting and synchronous reluctance electric motor rotor is effectively utilized, and the difference in magnetic flux between the d-axis direction and the q-axis direction is increased as much as possible.

Figure 2:
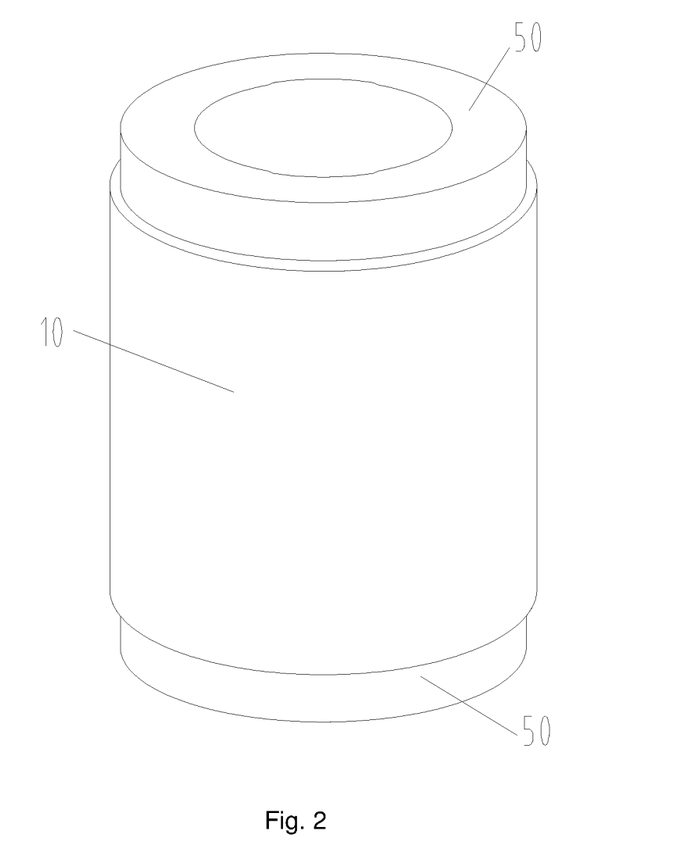
FIG. 2 is a schematic stereoscopic structure diagram of Embodiment 1 of an asynchronous starting and synchronous reluctance electric motor rotor according to the present invention.

As shown in FIGS. 2 and 3, the asynchronous starting and synchronous reluctance electric motor rotor further comprises cast-aluminum end rings 50. The cast-aluminum end rings 50 are located at two ends of the rotor core 10, and by the cast-aluminum end rings 50, all of the communicating magnetic barrier slots 31, the supplementary slots 214 and the independent magnetic barrier slots 32 are communicated to each other to form a squirrel cage.

In this embodiment, the rotor core 10 is formed by superposing silicon steel sheets axially.

Figure 6:
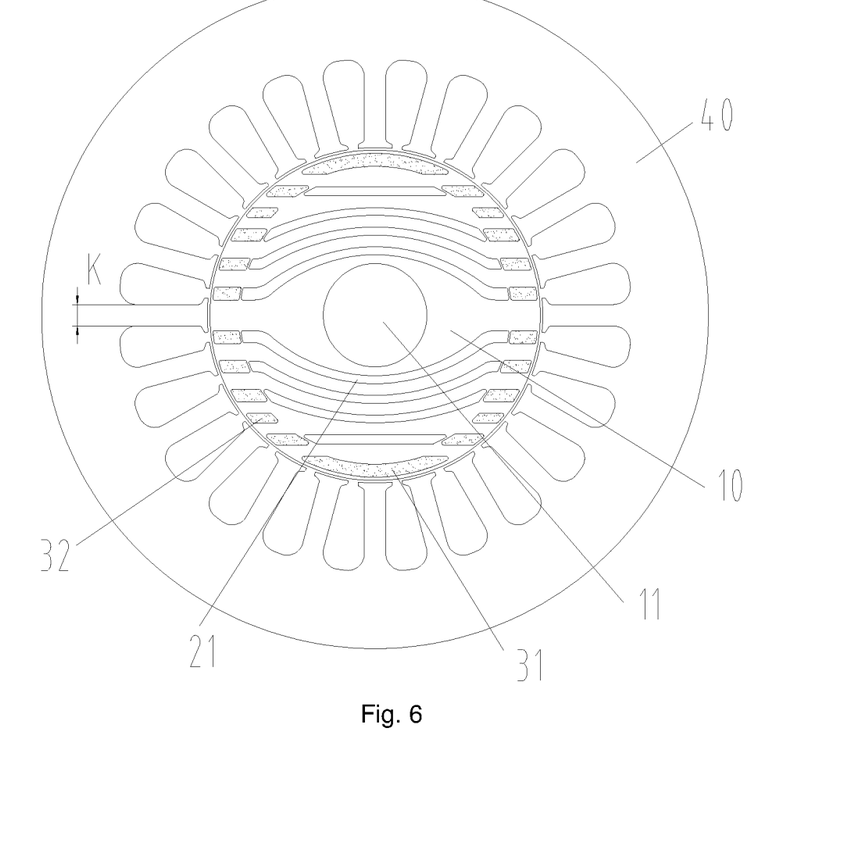
FIG. 6 is a top view of Embodiment 1 of a synchronous reluctance electric motor according to the present invention.

As shown in FIG. 6, the present application further provides a synchronous reluctance electric motor, comprising the asynchronous starting and synchronous reluctance electric motor rotor described above. In this embodiment, the synchronous reluctance electric motor can enable asynchronous starting and synchronous reluctance. By the first magnetic barrier structure and the second magnetic barrier structure, the difference in magnetic flux of the electric motor in the d-axis direction and the q-axis direction is increased, so that the saliency ratio of the electric motor is increased. The problems of low efficiency and low speed of asynchronous electric motors are solved, and high-efficiency constant-speed operation is realized. Additionally, with regard to the synchronous reluctance electric motor in this embodiment, the problems of high cost and low reliability (for example demagnetization of magnets) of permanent magnet synchronous electric motors are solved. The synchronous reluctance electric motor does not use rare earth magnets and driving controllers, and has advantages of low cost and high reliability.

Specifically, when the synchronous reluctance electric motor is started, an induced current is generated in the squirrel cage, which works together with the current for the stator 40 to generate an induced torque to start, rotate and synchronize the synchronous reluctance electric motor.

As shown in FIGS. 4 and 6, the synchronous reluctance electric motor further comprises a stator 40 arranged outside the asynchronous starting and synchronous reluctance electric motor rotor, there is an air gap δ between a stator core of the stator 40 and a rotor core 10 of the asynchronous starting and synchronous reluctance electric motor rotor, and there is a distance L1 between an independent magnetic barrier slot 32 for the asynchronous starting and synchronous reluctance electric motor rotor and the outer edge of the rotor core 10 as well as between a supplementary slot 214 for the asynchronous starting and synchronous reluctance electric motor rotor and the outer edge of the rotor core 10, where $0.5\delta \leq L1 < \delta$. The distance δ is the width of the air gap between the stator core and the rotor core 10. In this way, by this distance, the magnetic flux leakage (leakage of magnetic flux) between the supplementary slot 214 for the asynchronous starting and synchronous reluctance electric motor rotor and the outer edge of the rotor core 10 is reduced. The magnetic flux in the magnetic flux flow channels is increased, and the output of the electric motor is increased.

As shown in FIGS. 4 and 6, the synchronous reluctance electric motor further comprises a stator 40 arranged outside the asynchronous starting and synchronous reluctance electric motor rotor, there is an air gap δ between a stator core of the stator 40 and a rotor core 10 of the asynchronous starting and synchronous reluctance electric motor rotor, and there is a distance L2 between a supplementary slot 214 for the asynchronous starting and synchronous reluctance electric motor rotor and a first magnetic barrier portion 21 for the asynchronous starting and synchronous reluctance electric motor rotor, where $0.5\delta \leq L2 < \delta$. In this way, by this distance, the magnetic flux leakage (leakage of magnetic flux) between the supplementary slot 214 for the asynchronous starting and synchronous reluctance electric motor rotor and the first magnetic barrier portion 21 for the asynchronous starting and synchronous reluctance electric motor rotor is reduced. The magnetic flux in the magnetic flux flow channels is increased, and the output of the electric motor is increased.

As shown in FIGS. 4 and 6, the synchronous reluctance electric motor further comprises a stator 40 arranged outside the asynchronous starting and synchronous reluctance electric motor rotor, there is an air gap δ between a stator core of the stator 40 and a rotor core 10 of the asynchronous starting and synchronous reluctance electric motor rotor, and there is a distance L3 between a communicating magnetic barrier slot 31 and the outer edge of the rotor core 10, where $\delta \leq L3 \leq 2\delta$. In this way, by this distance, the structural strength of the asynchronous starting and synchronous reluctance electric motor rotor can be ensured, the service life of the asynchronous starting and synchronous reluctance electric motor rotor can be prolonged, and the normal operation of the synchronous reluctance electric motor can be ensured.

As shown in FIGS. 5 and 6, the synchronous reluctance electric motor further comprises a stator 40 arranged outside the asynchronous starting and synchronous reluctance electric motor rotor, there is a distance D6 between two supplementary slots 214, near the q-axis, for the asynchronous starting and synchronous reluctance electric motor rotor, and the tooth width K of the stator core of the stator 40 and the distance D6 have the following relationship: D6>K. In this way, such an arrangement can avoid oversaturated magnetic flux between two supplementary slots 214, near the q-axis, for the asynchronous starting and synchronous reluctance electric motor rotor, and also ensure the effective entering of the magnetic flux into the stator teeth to generate a torque.

Figure 8:
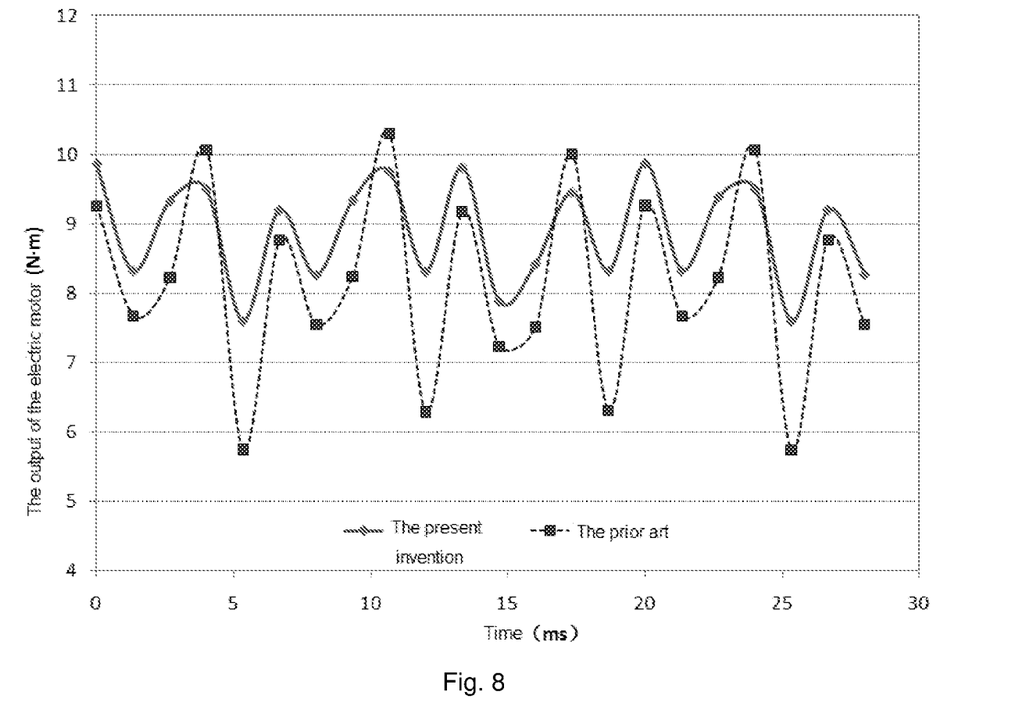
FIG. 8 is a graph showing the comparison between the synchronous reluctance electric motor in the present invention and the synchronous reluctance electric motor in the prior art, in terms of output and torque.

As shown in FIG. 8, in the same solution of stator and at the same current, the output of the synchronous reluctance electric motor in this embodiment is about 10% higher than that of synchronous reluctance electric motor in the prior art. The output of the electric motor is increased, and the efficiency of the electric motor is improved.

Figure 10:
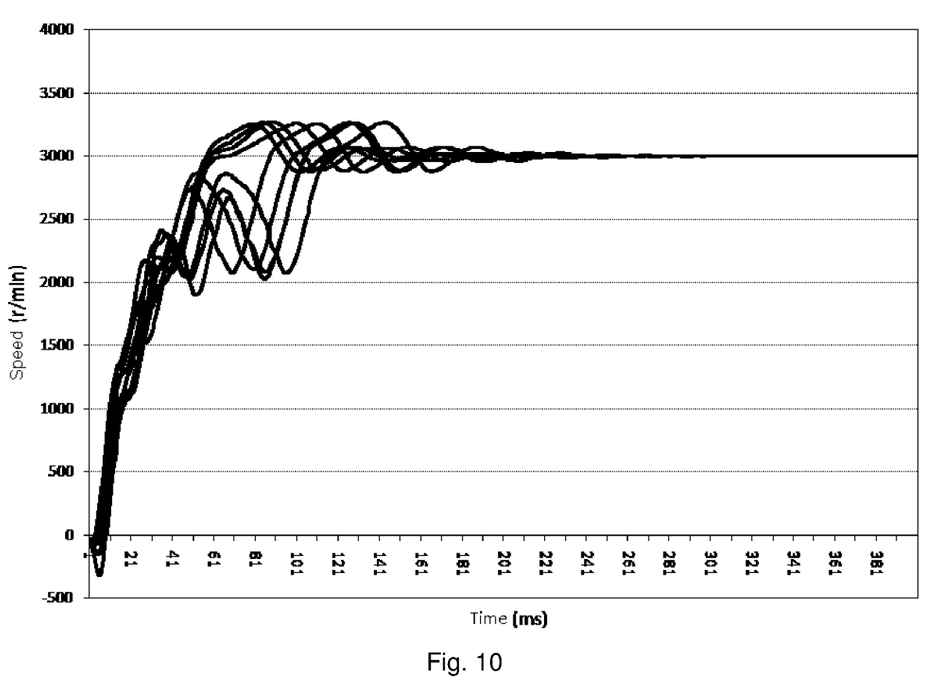
FIG. 10 is a graph showing the starting speed of the synchronous reluctance electric motor at 0.85× rated voltage and rated torque.

As shown in FIG. 10, the synchronous reluctance electric motor in this embodiment can be started and synchronized at different initial positions. The starting performance meets the operating requirements.

The present application further provides a compressor (not shown), comprising the synchronous reluctance electric motor described above. By the synchronous reluctance electric motor in this embodiment, both the operating performance and the operating efficiency of the compressor can be improved.

Embodiment 2

The asynchronous starting and synchronous reluctance electric motor rotor in Embodiment 2 and the asynchronous starting and synchronous reluctance electric motor rotor in Embodiment 1 differ in that the structure of the first magnetic barrier portions 21 is different.

Figure 7:
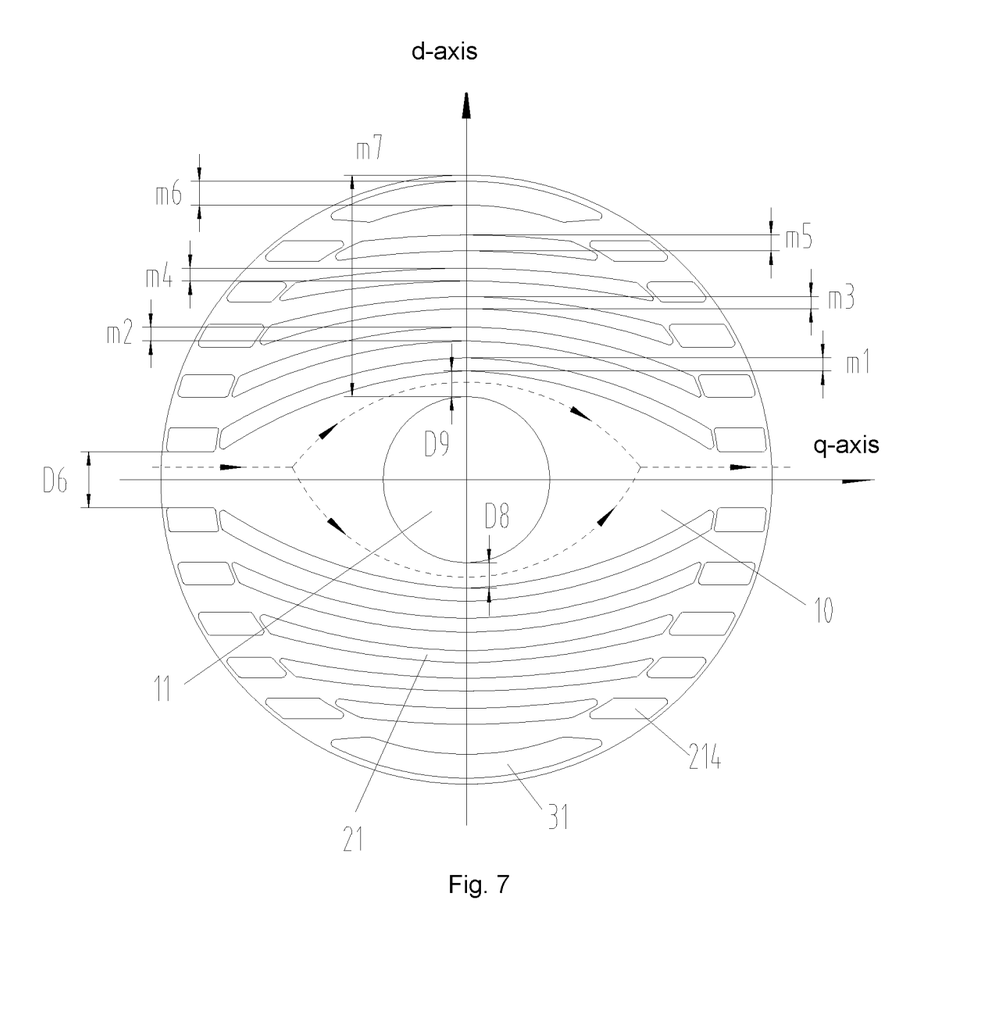
FIG. 7 is a top view of Embodiment 2 of the asynchronous starting and synchronous reluctance electric motor rotor according to the present invention.

As shown in FIG. 7, the rotor core 10 has a central through hole 11, through which a rotating shaft runs; when all of the first magnetic barrier portions 21 are second arc-shaped slots, the second arc-shaped slots are arranged to evade the central through hole 11; and the second arc-shaped slots protrude toward a side away from the central through hole 11. In this way, such an arrangement can eliminate the magnetic flux leakage between the supplementary slots 214 for the asynchronous starting and synchronous reluctance electric motor rotor and the first magnetic barrier portions 21 for the asynchronous starting and synchronous reluctance electric motor rotor, so that the magnetic flux in the q-axis direction is increased, the difference in magnetic flux between the d-axis direction and the q-axis direction is increased, and the torque of the asynchronous starting and synchronous reluctance electric motor rotor is increased. Thus, the output of the electric motor is increased, and the operating efficiency of the electric motor is improved.

In this embodiment, M is the sum of m1, m2, m3, m4, m5 and m6.

Embodiment 3

The asynchronous starting and synchronous reluctance electric motor rotor in Embodiment 3 and the asynchronous starting and synchronous reluctance electric motor rotor in Embodiment 2 differ in that the asynchronous starting and synchronous reluctance electric motor rotor has no independent magnetic barrier slot 32.

In this embodiment, the asynchronous starting and synchronous reluctance electric motor rotor has no independent magnetic barrier slot. In the d-axis direction, each supplementary slot and a corresponding first magnetic barrier portion form a magnetic barrier; and in the q-axis direction, a magnetic flux flow channel is formed between two adjacent groups of magnetic barriers. Thus, the magnetic flux flows in the q-axis direction and the magnetic flux is obstructed in the d-axis direction. Thus, the difference in magnetic flux between the d-axis direction and the q-axis direction is increased. Accordingly, a greater reluctance torque is generated by the asynchronous starting and synchronous reluctance electric motor rotor. Thus, the output of the electric motor is increased, and the operating efficiency of the electric motor is improved.

Embodiment 4

The asynchronous starting and synchronous reluctance electric motor rotor in Embodiment 4 and the asynchronous starting and synchronous reluctance electric motor rotor in Embodiment 1 differ in that the structure for communicating the supplementary slots to the first magnetic barrier portions in the first magnetic barrier structure is different.

In this embodiment, the communication of the supplementary slots to the first magnetic barrier portions in the first magnetic barrier structure does not include supplementary slots, and the first and second magnetic barrier structures are all filled with the material is electrically conductive but not magnetically conductive. Specifically, some or all of the first magnetic barrier portions are specially-shaped slots, and at least two groups of first magnetic barrier portions are linear slots. In this way, for asynchronous starting and synchronous reluctance electric motor rotors of different specifications, different first magnetic barrier portions are designed, so that the utilization of the rotor core is increased. The magnetic flux of the asynchronous starting and synchronous reluctance electric motor rotor in the q-axis direction is increased while the magnetic flux of the asynchronous starting and synchronous reluctance electric motor rotor in the d-axis direction is obstructed, so that the difference in magnetic flux between the d-axis direction and the q-axis direction is increased. Thus, the operating performance of the asynchronous starting and synchronous reluctance electric motor rotor is improved.

From the above description, it can be known that the above embodiments have the following technical effects.

The first magnetic barrier portions are arranged at intervals along the d-axis of the rotor core and extended toward the q-axis, and the slot walls of two ends of the communicating magnetic barrier slots are arranged parallel to the q-axis, so that the magnetic flux of the asynchronous starting and synchronous reluctance electric motor rotor in the q-axis direction is increased. Thus, the magnetic flux flows smoothly in the q-axis direction, and the magnetic flux in the d-axis direction is obstructed, so that the difference in magnetic flux of the asynchronous starting and synchronous reluctance electric motor rotor between the d-axis direction and the q-axis direction is increased. In this way, the output power and the operating efficiency of the asynchronous starting and synchronous reluctance electric motor rotor are improved.

During the operation of the asynchronous starting and synchronous reluctance electric motor rotor in the present application, the magnetic flux can flow between the first magnetic barrier portions and between the first magnetic barrier portions and the communicating magnetic barrier slots in the q-axis direction. It is ensured that the magnetic flux in the q-axis direction flows smoothly and the magnetic flux in the d-axis direction is obstructed. Thus, the difference in magnetic flux between the d-axis direction and the q-axis direction is increased. Accordingly, a greater reluctance torque is generated by the asynchronous starting and synchronous reluctance electric motor rotor. Thus, the output of the electric motor is increased, and the operating efficiency of the electric motor is improved. Additionally, the asynchronous starting and synchronous reluctance electric motor rotor in the present application does not use rare earth magnets. Thus, the cost for producing the asynchronous starting and synchronous reluctance electric motor rotor is reduced. The operating reliability of the asynchronous starting and synchronous reluctance electric motor rotor is improved.

Apparently, the embodiments described above are just some, but not all, of the embodiments of the present invention. Based on the embodiments of the present invention, all other embodiments obtained by a person of ordinary skill in the art without paying any creative effort shall be included in the protection scope of the present invention.

It is to be noted that terms, as used herein, are merely for describing the specific implementations, and not intended to limit the exemplary implementations of the present application. Unless otherwise specifically stated, the singular as used herein is intended to include the plural. Furthermore, it should be understood that terms "including" and/or "comprising", as used herein, indicate the presence of features, steps, tasks, devices, components, and/or combinations thereof.

It is to be noted that terms such as "first" and "second", as used in the description, claims and drawings of the present application, are used to distinguish similar objects, and are not necessarily used to define a particular order or sequence. It should be understood that data, as used in such a way, may be used interchangeably if appropriate, so that the implementations of the present application described here may be implemented in an order other than those illustrated or described here.

The foregoing content merely describes preferred embodiments of the present invention and is not intended to limit the present invention. For a person of ordinary skill in the art, the present invention may have various alterations and changes. Any modifications, equivalent replacements and improvements made within the spirit and principle of the present invention shall fall into the protection scope of the present invention.

The invention claimed is:

1. An asynchronous starting and synchronous reluctance electric motor rotor, comprising a rotor core, the rotor core comprising:
    a first magnetic barrier structure, comprising multiple groups of first magnetic barrier portions arranged at interval along a d-axis of the rotor core; and
    a second magnetic barrier structure, comprising two communicating magnetic barrier slots arranged at interval along the d-axis, the two communicating magnetic barrier slots being respectively located on two sides of the first magnetic barrier structure, the communicating magnetic barrier slots being arc-shaped slots extending circumferentially along the rotor core, and slot walls of two ends of the arc-shaped slots being arranged parallel to a q-axis, and
    a central through hole, through which a rotating shaft runs; when some or all of the first magnetic barrier portions are second arc-shaped slots, the second arc-shaped slots are arranged to evade the central through hole; and the second arc-shaped slots protrude toward a side away from the central through hole.

2. The asynchronous starting and synchronous reluctance electric motor rotor according to claim 1, wherein two ends of some or all of the first magnetic barrier portions are parallel to the q-axis of the rotor core.

3. The asynchronous starting and synchronous reluctance electric motor rotor according to claim 1, wherein, as the multiple groups of first magnetic barrier portions, one or more selected from linear slots, second arc-shaped slots and other slots are used;
    wherein the first magnetic barrier structure further comprises:
    multiple supplementary slots, respectively located between an end of the first magnetic barrier portion and an outer edge of the rotor core.

4. The asynchronous starting and synchronous reluctance electric motor rotor according to claim 3, wherein the supplementary slot extends in a direction parallel to the q-axis.

5. The asynchronous starting and synchronous reluctance electric motor rotor according to claim 3, wherein some of the first magnetic barrier portions are the other slots, and each of the other slots comprises a first linear slot section, an arc-shaped slot section and a second linear slot section, which are successively connected to each other; and, both the first linear slot section and the second linear slot section are parallel to the q-axis, and the arc-shaped slot section protrudes toward a side away from the central through hole.

6. The asynchronous starting and synchronous reluctance electric motor rotor according to claim 5, wherein some of the first magnetic barrier portions are the linear slots, the linear slots are parallel to the q-axis, and the linear slots are located between the communicating magnetic barrier slots and the other slots;
    wherein the second magnetic barrier structure further comprises:
    four independent magnetic barrier slots, respectively located on two sides of the q-axis pairwise, the independent magnetic barrier slots extending in a direction parallel to the q-axis.

7. The asynchronous starting and synchronous reluctance electric motor rotor according to claim 6, wherein
    the two independent magnetic barrier slots in a group are symmetrically arranged along the d-axis; and/or
    the independent magnetic barrier slots in different groups are symmetrically arranged along the q-axis.

8. The asynchronous starting and synchronous reluctance electric motor rotor according to claim 6, wherein there is a distance D1 between adjacent two of the supplementary slots and there is a distance D2 between adjacent two of the arc-shaped slot sections, where D1≥D2.

9. The asynchronous starting and synchronous reluctance electric motor rotor according to claim 8, wherein there is a distance D6 between the two supplementary slots near the q-axis and there is a distance D7 between the two first linear slot sections near the q-axis, where D6≥D7.

10. The asynchronous starting and synchronous reluctance electric motor rotor according to claim 9, wherein the distance D6, the distance D1, the distance D3 and the distance D4 have the following relationship: D6>D1, and/or D6>D3, and/or D6>D4.

11. The asynchronous starting and synchronous reluctance electric motor rotor according to claim 10, wherein, along the d-axis, there are distance D8 and distance D9 between the wall of the central through hole and the two arc-shaped slot sections adjacent thereto, where D8+D9≥D6.

12. The asynchronous starting and synchronous reluctance electric motor rotor according to claim 8, wherein a distance D3 and distance D4 between the independent magnetic barrier slot and the two supplementary slots adjacent thereto, and in the d-axis direction, there is a distance D5 between the linear slot and the arc-shaped slot section adjacent thereto, where D3+D4≥D5.

13. The asynchronous starting and synchronous reluctance electric motor rotor according to claim 6, wherein there are cast-aluminum end rings at two ends of the rotor core, and by the cast-aluminum end rings, all of the communicating magnetic barrier slots, the supplementary slots and the independent magnetic barrier slots are communicated to each other to form a squirrel cage.

14. The asynchronous starting and synchronous reluctance electric motor rotor according to claim 5, wherein the sum of widths of all of the communicating magnetic barrier slots and all of the first magnetic barrier portions is denoted by M, and there is a distance m7 between the wall of the central through hole and the outer edge of the rotor core, where $$0.3 \leq \frac{M}{m7} \leq 0.5.$$

15. The asynchronous starting and synchronous reluctance electric motor rotor according to claim 1, wherein
    the two communicating magnetic barrier slots are symmetrically arranged along the q-axis; and/or the communicating magnetic barrier slot is symmetrically arranged along the d-axis.

16. An electric motor, comprising the asynchronous starting and synchronous reluctance electric motor rotor according to claim 1.

17. The electric motor according to claim 16, wherein the electric motor further comprises a stator arranged outside the asynchronous starting and synchronous reluctance electric motor rotor, there is an air gap δ between the stator core of the stator and the rotor core of the asynchronous starting and synchronous reluctance electric motor rotor, and there is a distance L1 between the independent magnetic barrier slot for the asynchronous starting and synchronous reluctance electric motor rotor and the outer edge of the rotor core as well as between the supplementary slot for the asynchronous starting and synchronous reluctance electric motor rotor and the outer edge of the rotor core, where 0.5δ≥L1≥δ;

or, wherein the electric motor further comprises a stator arranged outside the asynchronous starting and synchronous reluctance electric motor rotor, there is an air gap δ between the stator core of the stator and the rotor core of the asynchronous starting and synchronous reluctance electric motor rotor, and there is a distance L2 between the supplementary slot for the asynchronous starting and synchronous reluctance electric motor rotor and the first magnetic barrier portion for the asynchronous starting and synchronous reluctance electric motor rotor, where 0.5δ≥L2≥δ;

or, wherein the electric motor further comprises a stator arranged outside the asynchronous starting and synchronous reluctance electric motor rotor, there is an air gap δ between the stator core of the stator and the rotor core of the asynchronous starting and synchronous reluctance electric motor rotor, and there is a distance L3 between the communicating magnetic barrier slot and the outer edge of the rotor core, where δ≥L3≥2δ;

or, wherein the electric motor further comprises a stator arranged outside the asynchronous starting and synchronous reluctance electric motor rotor, there is a distance D6 between two supplementary slots, near the q-axis, for the asynchronous starting and synchronous reluctance electric motor rotor, and the tooth width K of the stator core of the stator and the distance D6 have the following relationship: D6>K.

18. A compressor, comprising the electric motor according to claim 16.

19. The asynchronous starting and synchronous reluctance electric motor rotor according to claim 1, wherein
the multiple groups of first magnetic barrier portions are symmetrically arranged along the q-axis; and/or
each first magnetic barrier portion is symmetrically arranged along the d-axis.

20. The asynchronous starting and synchronous reluctance electric motor rotor according to claim 1, wherein the first magnetic barrier structure and/or the second magnetic barrier structure are/is filled with a material that is electrically conductive but not magnetically conductive;

or, wherein the communicating magnetic barrier slots have a radian α of 20°≤α≤60°.

* * * * *